United States Patent
Adey et al.

(10) Patent No.: US 10,946,391 B2
(45) Date of Patent: Mar. 16, 2021

(54) MAGNETIC FILTER WITH DRAIN AND REMOVABLE EXTERNAL MAGNETIC ELEMENT

(71) Applicant: Adey Holdings (2008) Limited, Cheltenham Gloucestershire (GB)

(72) Inventors: Christopher Adey, Cheltenham Gloucestershire (GB); Simon Downie, Cheltenham (GB); Robert Charles Albrow, Malvern Worcestershire (GB)

(73) Assignee: ADEY HOLDINGS (2008) LIMITED, Gloucestershire (GB)

( * ) Notice: Subject to any disclaimer, the term of this patent is extended or adjusted under 35 U.S.C. 154(b) by 30 days.

(21) Appl. No.: 16/439,917

(22) Filed: Jun. 13, 2019

(65) Prior Publication Data

US 2019/0308200 A1    Oct. 10, 2019

Related U.S. Application Data

(63) Continuation of application No. 15/565,325, filed as application No. PCT/GB2016/050963 on Apr. 6, 2016, now Pat. No. 10,449,551.

(30) Foreign Application Priority Data

Apr. 9, 2015  (GB) ..................................... 1506054

(51) Int. Cl.
*B03C 1/28* (2006.01)
*B01D 21/00* (2006.01)
(Continued)

(52) U.S. Cl.
CPC .......... *B03C 1/288* (2013.01); *B01D 21/0009* (2013.01); *B01D 35/06* (2013.01);
(Continued)

(58) Field of Classification Search
None
See application file for complete search history.

(56) References Cited

U.S. PATENT DOCUMENTS

| 2,608,303 A | * | 8/1952 | Ford | ................. B01D 17/0214 |
| | | | | 210/513 |
| 4,585,553 A | | 4/1986 | Hikosaka et al. | |

(Continued)

FOREIGN PATENT DOCUMENTS

| EP | 2614893 A1 | * | 7/2013 | ............. B01D 35/06 |
| EP | 2614893 A1 | | 7/2013 | |

(Continued)

OTHER PUBLICATIONS

In re Giannelli, case 2013-1167 (Fed Cir) (2014) (Year: 2014).*

*Primary Examiner* — Chester T Barry
(74) *Attorney, Agent, or Firm* — Michael E. Dockins; Shumaker, Loop & Kendrick, LLP (57) ABSTRACT

A magnetic filter 10 for a central heating system is disclosed, the filter 10 including a connection assembly 12, a canister 14, and a magnetic element 16, the connection assembly 12 including an inlet 24 and an outlet 26 for connection to a central heating circuit; the canister 14 having an interior separation chamber which is fluidly connected with the inlet 24 and outlet 26 for allowing fluid to flow into the inlet 24, through the separation chamber, and out of the outlet 26; and the magnetic element 16 being removably positionable on the outside of the canister 14, the canister 14 and the connection assembly 12 forming a sealed flow path comprising the inlet 24, the interior separation chamber and the outlet 26, and the connection assembly 12 further including a closable drain outlet 28*b* for draining fluid and magnetic particles from within the canister 14, internally of the magnetic element 16.

22 Claims, 10 Drawing Sheets

(51) Int. Cl.
  *B01D 35/06* (2006.01)
  *B03C 1/30* (2006.01)
  *C02F 1/48* (2006.01)
  *F24D 19/00* (2006.01)
  *F28F 19/01* (2006.01)

(52) U.S. Cl.
  CPC ............... B03C 1/30 (2013.01); C02F 1/482 (2013.01); F24D 19/0092 (2013.01); F28F 19/01 (2013.01); *B03C 2201/18* (2013.01); *B03C 2201/28* (2013.01)

(56) References Cited

U.S. PATENT DOCUMENTS

| | | | |
|---|---|---|---|
| 5,242,587 A * | 9/1993 | Barrington | B01D 35/06 |
| | | | 204/664 |
| 5,714,063 A | 2/1998 | Brunsting | |
| 5,716,517 A * | 2/1998 | Lasky | B01D 27/103 |
| | | | 210/130 |
| 6,007,716 A | 12/1999 | Calvert | |
| 6,939,464 B1 * | 9/2005 | Jiang | B01D 29/21 |
| | | | 210/232 |
| 2002/0195383 A1 * | 12/2002 | Caiozza | B01D 35/06 |
| | | | 210/223 |
| 2007/0034560 A1 * | 2/2007 | Janik | B01D 27/08 |
| | | | 210/248 |
| 2007/0144350 A1 * | 6/2007 | Paling | B01D 53/261 |
| | | | 96/134 |
| 2014/0367340 A1 | 12/2014 | Caleffi | |

FOREIGN PATENT DOCUMENTS

| | | | | |
|---|---|---|---|---|
| EP | 2829811 A1 * | 1/2015 | | B03C 1/288 |
| EP | 2829811 A1 | 1/2015 | | |
| GB | 2486172 A | 6/2012 | | |
| GB | 2510535 A * | 8/2014 | | B03C 1/288 |
| WO | WO-2009125171 A1 * | 10/2009 | | B03C 1/286 |
| WO | 2013077729 A1 | 5/2013 | | |
| WO | WO-2013077729 A1 * | 5/2013 | | B03C 1/288 |

* cited by examiner

MAGNETIC FILTER WITH DRAIN AND REMOVABLE EXTERNAL MAGNETIC ELEMENT

CROSS-REFERENCE TO RELATED APPLICATION

This application claims the benefit of priority of and is a continuation of U.S. application Ser. No. 15/565,325 which is a national stage application claiming the benefit of priority of PCT/GB2016/050963, each of which are incorporated herein by reference in their entireties.

FIELD OF THE INVENTION

The present invention relates to a magnetic filter for a central heating system, and in particular to a filter having a magnet on the outside of a sealed separation chamber.

BACKGROUND TO THE INVENTION

Magnetic filters, which are designed to remove magnetic particles entrained in system water, are now commonly installed in central heating systems. Central heating systems include a main circuit which carries system water around the system. The system water often contains various chemicals, for example inhibitors, as well as magnetic and non-magnetic dirt which is picked up from radiators and other devices in the circuit.

All magnetic filters include a separation chamber, through which system water flows, and a magnet which is designed to attract particles entrained in the system water, as the water flows through the separation chamber. The particles are then typically retained within the chamber until the magnetic filter is serviced and the retained particles are removed and disposed of.

Various different types of filter are known in the art. For example, the Applicant's granted British Patent GB2486172 discloses a filter which includes a sealed canister through which system water flows, and a sleeved magnet inside the canister. When the filter needs to be cleaned, the filter must be disconnected from the heating circuit and the canister must then be opened to remove the sleeve and magnet. Once the sleeve has been removed from the canister, the magnet can be removed from the sleeve allowing magnetic particles to be easily removed and disposed of.

Disconnecting the filter from the heating circuit is a necessary step before opening the canister, because otherwise system water will flow out of the system when the canister is opened. Even with the filter disconnected, some leakage or spillage is not unlikely when opening the sealed canister, removing and replacing the magnet. Also, repeatedly opening the canister makes damage to the seal more likely.

Some other types of filter provide a magnet outside the sealed canister. For example, the filter disclosed in WO2013077729 (SPIRO ENTERPRISES) includes a magnet which can be detachably positioned around the outside of the canister. In this type of filter, flushing of magnetic particles can be achieved by disconnecting the filter from the heating circuit (by closing valves), removing the magnet, and opening a drain valve. The water contained within the canister will then drain out (for example, into a bucket) and the magnetic particles—which are no longer being retained by the magnet—will drain away as well. Optionally, one of the valves connecting the filter to the heating circuit may be opened briefly, causing pressurised system water to rush out of the system via the filter, cleaning out any magnetic particles which are still inside.

The advantage of this type of filter is that it can be cleaned without opening the sealed canister. Only a drain valve has to be opened. This provides a more controlled cleaning process, which is less likely to result in spillage. Also, the seal on the canister is less likely to fail, since the canister never needs to be opened for servicing. Indeed, it may be possible to manufacture the canister integrally as a single sealed unit.

Unfortunately, this type of filter is generally less effective at removing magnetic particles, because the strength of the magnet is attenuated by the thickness of the wall of the canister.

It is an object of the invention to reduce or substantially obviate the above mentioned problems.

STATEMENT OF INVENTION

According to the present invention, there is provided a magnetic filter for a central heating system, the filter including a connection assembly, a canister, and a magnetic element, the connection assembly including an inlet and an outlet for connection to a central heating circuit;

the canister having an interior separation chamber which is fluidly connected with the inlet and outlet for allowing fluid to flow into the inlet, through the separation chamber, and out of the outlet; and the magnetic element being removably positionable on the outside of the canister, the canister and the connection assembly forming a sealed flow path comprising the inlet, interior separation chamber and the outlet, and the connection assembly further including a closable drain outlet for draining fluid and magnetic particles from within the canister, internally of the magnetic element.

By providing an inlet, outlet and drain outlet as part of a connection assembly, the canister can be a very simple component, for example, the canister in one embodiment is a thin-walled stainless steel cylindrical shell with an open end. Because the canister does not need to include any valves or connectors, it can be manufactured easily from a thin material, which in turn means that the strength of the magnet is not greatly attenuated, resulting in greater separation performance.

The magnetic element may be in the form of a sleeve, which surrounds the canister when attached.

The canister and the connection assembly form a sealed unit. In some embodiments, the connection assembly may in effect form a 'lid' on the canister. However, there is no reason in normal use or in servicing for the connection assembly to be removed from the canister. In some embodiments, the canister and the connection assembly may be factory-sealed, and not removable from each other once assembled.

The connection assembly and the canister may be formed from different materials. In particular, the connection assembly may be made from Brass, and/or the canister may be made from stainless steel. Brass and stainless steel are both resistant to corrosion, and therefore are suitable for use in parts of the filter which are in contact with system water in use. Brass is ideal for casting connection assemblies which include inlet and outlet connectors, a drain valve, and optionally other components such as a bleed valve. However, brass components must be cast with relatively thick walls. On the other hand, a simple but strong canister with unbroken walls can be made from thin stainless steel.

The canister may be in the form of a shell having unbroken walls and a single opening. A rim or flange may surround the opening. The rim of the canister may be used to attach the canister to the connection assembly. For example, the connection assembly may have a thread on part of its external surface. To hold the canister to the connection assembly, a screw-threaded retaining ring may be provided. The rim of the canister may be placed against the connection assembly, and the screw threaded retaining ring may then be located over the canister, behind the rim, and screwed onto the connection assembly. An O-ring seal, or any other type of seal, may be provided between the canister and the connection assembly.

The magnetic element may be in the form of a shell which is of a similar shape, but slightly larger, than the canister. The magnetic element may therefore be placed over the canister, to cover substantially the entire outer surface of the canister. The magnetic element (i.e. the shell) may be made from a similar material to the connection assembly (for example, brass). The complete assembled filter can therefore produce the impression of an entirely brass filter, which is popular with some customers. However, this is done without the performance disadvantages associated with known brass-bodied filters caused by the thickness of the brass walls.

A releasable connection means may be provided between the magnetic element and the connection assembly. Where a retaining ring is provided, the magnetic element may be attached to the connection assembly via the retaining ring. Alternatively, the releasable connection means may include a thread, bayonet fitting, or any other type of releasable connection means. In some embodiments, the magnetic element may be directly attached to the canister.

The magnetic element may include at least one magnet array, the or each magnet array being made up of magnets, each magnet in the or each array being positioned with its magnetic axis substantially perpendicular to the wall of the canister, when the magnetic element is positioned over the canister in use.

Each array may be in the form of a row of magnets.

Preferably, the magnets which make up the or each array are arranged with alternating polarity. For example, if the first magnet in the array is positioned with its north pole facing the canister, then the next magnet in the array is positioned with its south pole facing the canister, with the orientation of the magnets in an array alternating north, south, north, south etc.

Preferably, the magnets are provided in pairs. In each pair of magnets, one magnet is oriented with its north pole facing the canister, and the other magnet is oriented with its south pole facing the canister. A soft ferromagnetic strip may be bridged across the north and south poles of the magnet pair which face away from the canister. This forms part of a magnetic circuit between the two magnets of the pair, effectively causing the magnet pair to act like a single horseshoe magnet with almost all of the field strength directed towards the canister. Preferably, the soft ferromagnetic strip is made from mild steel.

Preferably, spring members are provided for pushing the magnets away from the exterior walls of the element, towards the canister when the element is installed over the canister. This ensures that the magnets are in contact with the outer wall of the canister, to reduce any attenuation of the field caused by separation between the canister and the magnets. In some embodiments, the magnets or magnet pairs may be mounted in carriers, for example a carrier may hold two magnet pairs and multiple carriers may be provided on the magnetic element.

In one embodiment, it is found that the best performance is obtained with six or seven carriers, and four magnets on each carrier, with the carriers arranged in a substantially axial direction on the surface of the canister, when the magnetic element is fitted. However, other arrangements may provide good performance in other configurations, depending on the desired collection capacity of the filter, and any constraints on size. For example, in one "compact" embodiment, a lower-capacity but smaller size filter includes twelve carriers having two magnets each, the carriers being arranged substantially circumferentially around the outside of the canister, in use.

Where carriers are provided, the spring members may be either between the carriers and each magnet, or may be between the carrier and the interior wall of the magnetic element, so that the whole carrier is pushed by the springs away from the interior wall of the element, towards the canister. The carriers may be made from plastics, and the spring members may be formed integrally as part of the carrier.

Ideally, the magnetic element and carriers are made from a non-ferromagnetic material, for example plastics or brass. The magnets may be neodymium.

Preferably, the inlet on the connection assembly may carry fluid to the canister so that it enters the canister substantially at a periphery of the canister, i.e. against a wall of the canister. In one embodiment, the inlet of the connection assembly connects to a circumferential flow chamber in the connection assembly, which interfaces with the canister around an edge of the open end of the canister. The outlet of the connection assembly is preferably in fluid communication with the canister in a substantially central region of the canister, for example, in line with a central axis running through the open end of the canister. This arrangement is found to improve the collection efficiency of the magnets, without the need for any flow guides or obstruction means which may result in a larger drop in static pressure across the filter when installed.

Preferably, an air bleed vent is included as part of the connection assembly. In one embodiment, the inlet and outlet are provided as ports extending from either side of the connection assembly, substantially in line with each other. At least part of the connection assembly may have a substantially cylindrical shape, and the air bleed vent and drain valve may be provided at substantially opposing points on the curved surface, extending away from the curved surface at an acute angle to the curved surface at the point where the air bleed/drain meets the curved surface.

Ideally, the air bleed and drain valve are provided as identical fitments, so that the use of each as an air bleed or a drain is interchangeable, allowing for different orientations of the filter in use. For example, where the filter is installed on substantially vertical pipework, the inlet and outlet are positioned on a substantially vertical line. The air bleed and drain may be substantially perpendicular to the inlet and outlet, but since the air bleed and drain do not extend perpendicularly from the connection assembly the air bleed and drain are not vertically central with the inlet and outlet aligned vertically. Instead, one of the identical fitments will be closer to the top of the filter and one will be closer to the bottom of the filter. In some embodiments, an air bleed fitting and a drain plug or valve may be provided, which are different from each other, but which each fit into either of the identical air bleed/drain fitments. The air bleed fitting may be installed in the uppermost fitment, and the drain plug or valve may be installed in the lowermost fitment.

If the filter is installed on pipework which runs substantially horizontally, then again the air bleed/drain fitments will be located with one close to the top and one close to the bottom. Since it is generally preferable not to reverse the use of the inlet and outlet ports for efficient operation, the filter may be installed in different orientations on either horizontal or vertical pipework. On horizontal pipework the flow may be either left to right or right to left, and on vertical pipework the flow may be either top to bottom or bottom to top.

The air bleed and the drain fitments may therefore be provided on the connection assembly, each fitment offset from one of the inlet and outlet ports by substantially 45 degrees, and the fitments opposing each other across the connection assembly, that is, the fitments may be 180 degrees offset from each other.

DESCRIPTION OF THE DRAWINGS

For a better understanding of the present invention, and to show more clearly how it may be carried into effect, reference will now be made by way of example only to the accompanying drawings, in which.

DESCRIPTION OF A PREFERRED EMBODIMENT

Figure 1:
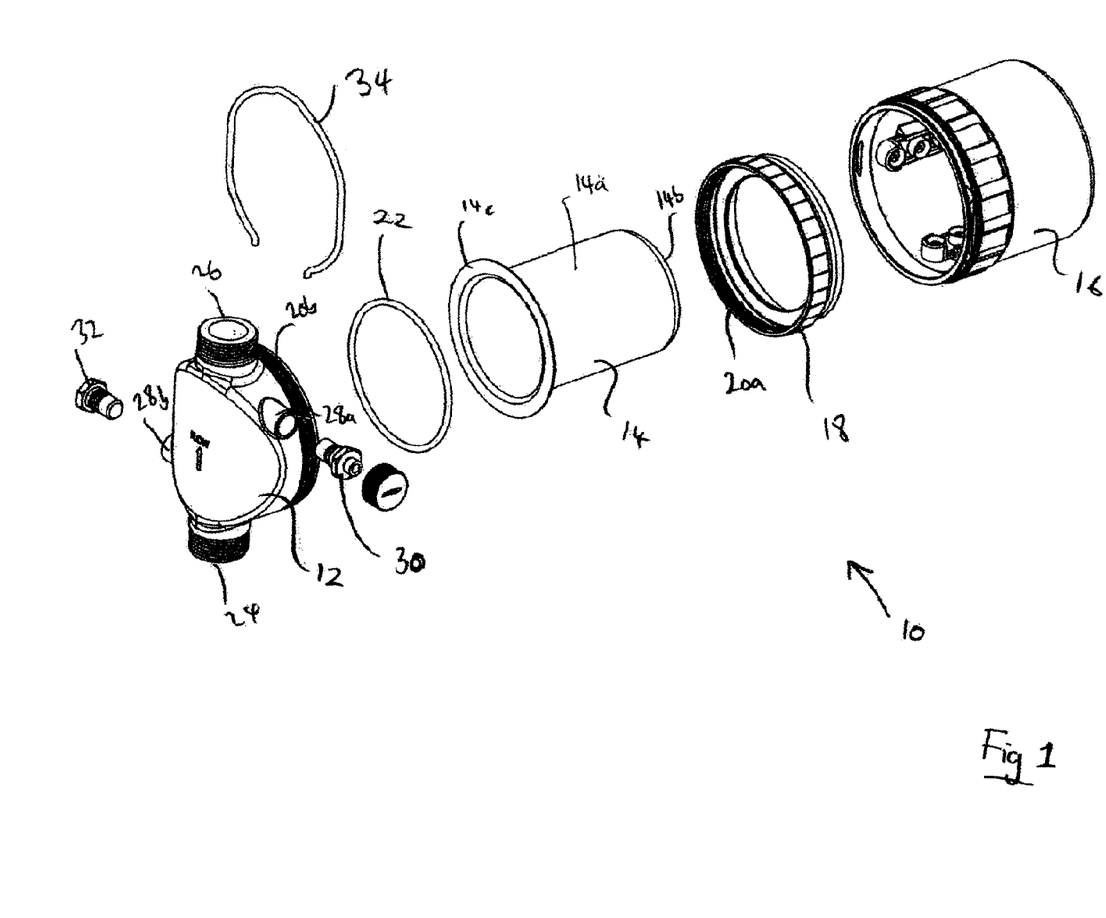
FIG. 1 shows an exploded view of a filter according to the invention.
Figure 2:
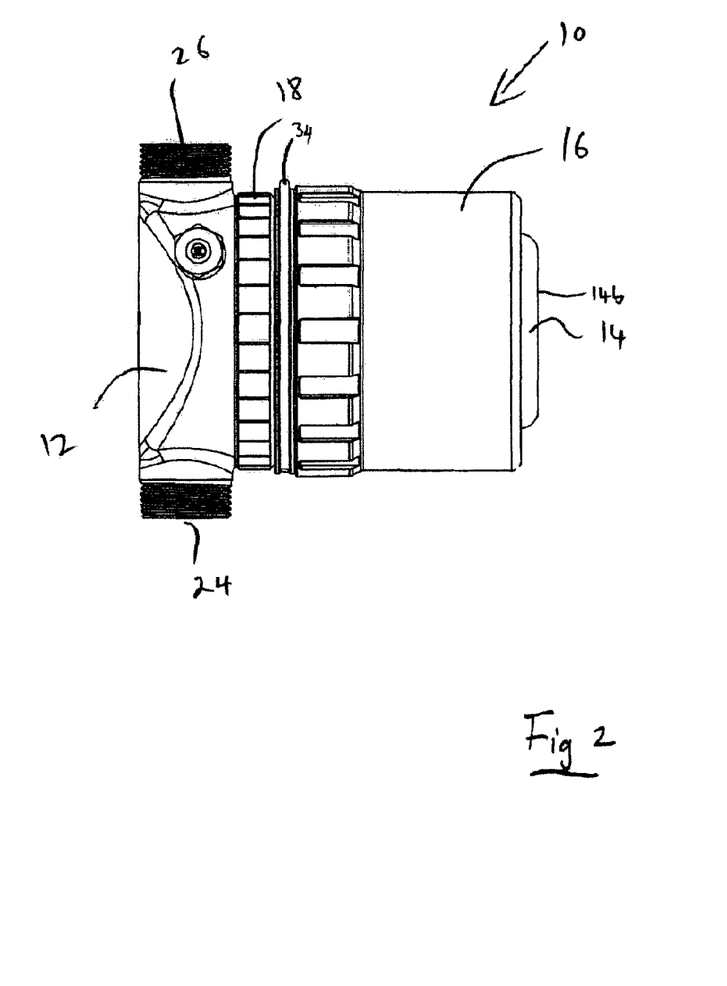
FIG. 2 shows the assembled filter of FIG. 1.

Referring firstly to FIGS. 1 and 2, a magnetic filter for a central heating system is indicated generally at 10. The magnetic filter comprises a connection assembly 12, a canister 14, and a magnetic element 16. The overall shape of the assembled filter is substantially cylindrical, as seen best in FIG. 2.

The connection assembly 12 is located at one end of the cylindrical filter, and forms a substantially circular end cap on the canister 14. The connection assembly includes an inlet port 24 and an outlet port 26. The canister 14 is cylindrical and open at one end. In other words, the canister 14 has a curved wall 14a and a flat end wall 14b. A rim 14c surrounds the open end, extending outwardly from an edge of the curved wall, forming a circumferential flange.

The canister 14 is assembled onto the connection assembly 12 by placing the rim 14c against the connection assembly 12, and then providing a retaining ring 18 behind the rim 14c of the canister 14. The retaining ring includes an interior screw thread 20a which can be screwed onto a corresponding screw thread 20b on the connection assembly 12. The rim 14c of the canister 14 is therefore held between the retaining ring 18 and the connection assembly 12, which are screwed tightly together. An O-ring 22 is provided between the rim 14c and the connection assembly 12, to form a watertight seal.

With the canister 14 screwed onto the connection assembly 12, as described, the interior of the connection assembly and the canister forms a separation chamber, with an inlet and an outlet at ports 24, 26. The inlet and outlet ports 24, 26 in use are connected in a central heating system circuit, and when installed the separation chamber forms part of the sealed system circuit.

Two identical fitments 28a, 28b are provided on the connection assembly 12. Each of the fitments can accept either an air bleed fitting 30 or a drain plug 32.

The magnetic element 16 is substantially in the form of a sleeve, which substantially surrounds the canister 14 when installed. The sleeve is substantially cylindrical and in this embodiment is open at both ends, so that the end wall 14b of the canister 14 protrudes slightly out of the magnetic element 16, as shown in FIG. 2. Alternatively, the sleeve may be closed at one end to substantially hide the canister 14 when fitted.

In this embodiment, the magnetic sleeve 16 is held in place by a spring clip, which attaches the magnetic sleeve to the retaining ring 18. However, any suitable means of attaching the magnetic sleeve 16 to the rest of the filter 10 may be employed, and the magnetic element 16 may be attached to the connection assembly 12, the canister 14, or to any other part of the filter 10.

Figure 3A:
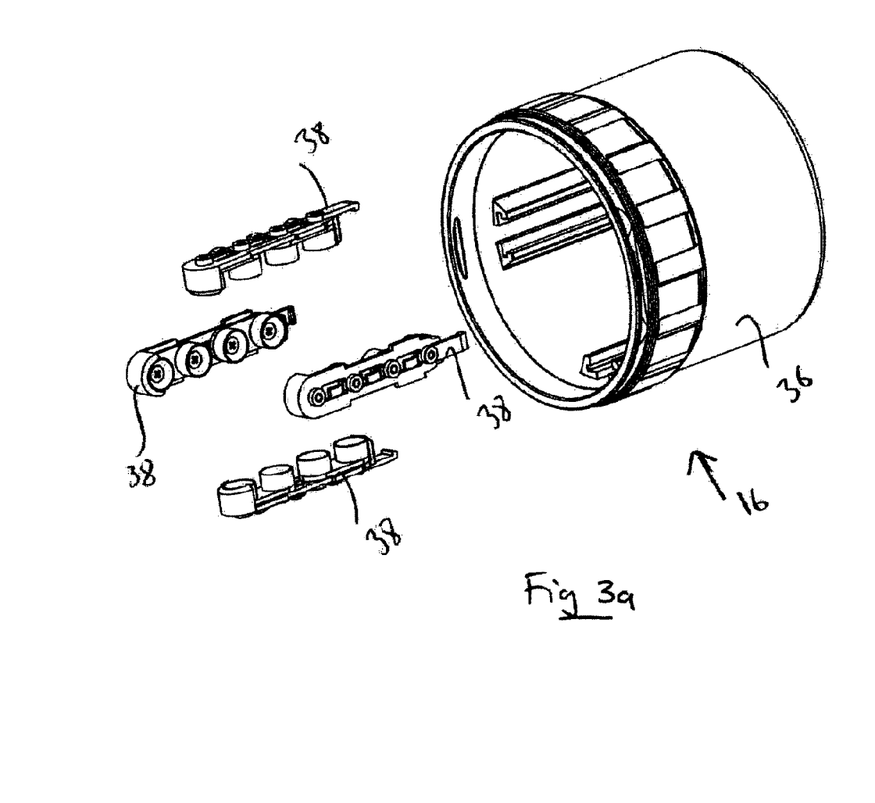
FIGS. 3a and 3b are respectively exploded and assembled views of a magnetic element, forming part of the filter of FIG. 1.
Figure 3B:
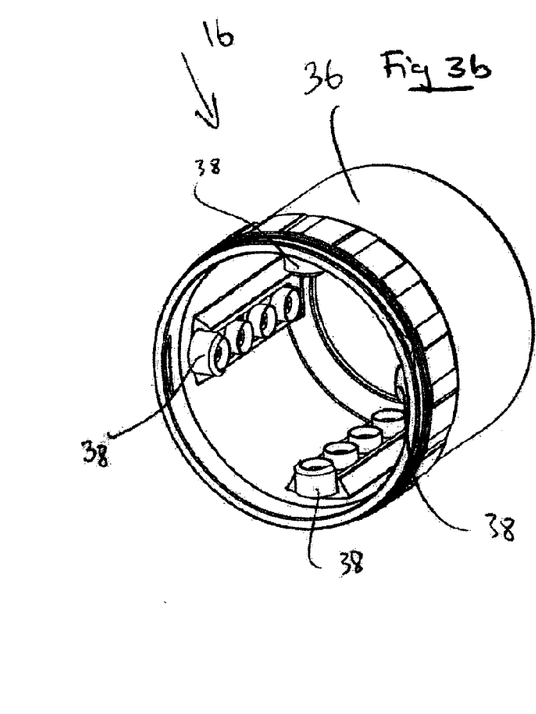

The magnetic element 16 will now be described in more detail, with reference to FIGS. 3a, 3b and 4. The magnetic element 16 comprises a non-magnetic shell 36, and a series of magnet arrays 38 provided on the interior surface of the shell. In the embodiments pictured in FIGS. 1 to 9, there are four magnet arrays 38, although in other embodiments six or seven magnet arrays may be provided. In this embodiment, the magnet arrays 38 are detachable from the shell 36.

Figure 4:
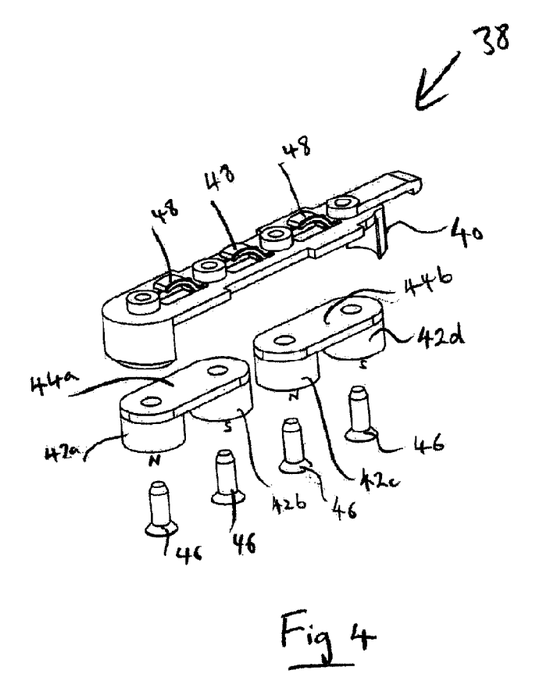
FIG. 4 is an exploded view of a magnet array assembly, part of the magnetic element of FIGS. 3a and 3b.

The construction of each array is best seen in FIG. 4. The array comprises a plastic carrier 40 which is adapted to receive four magnets 42a, 42b, 42c, 42d. The magnets are arranged as magnet pairs, with magnets 42a and 42b forming one magnet pair, and magnets 42c and 42d forming another pair. In each pair, the magnets are orientated with opposite polarity, so for example magnet 42a has its north pole facing substantially towards the canister (downwards in FIG. 4) and magnet 42b has its south pole facing substantially towards the canister. Each pair of magnets is provided with a soft ferromagnetic bridge element 44a, 44b, which bridges across the poles of the magnet pair which face away from the canister in use (the uppermost ends in FIG. 4).

Figure 10:
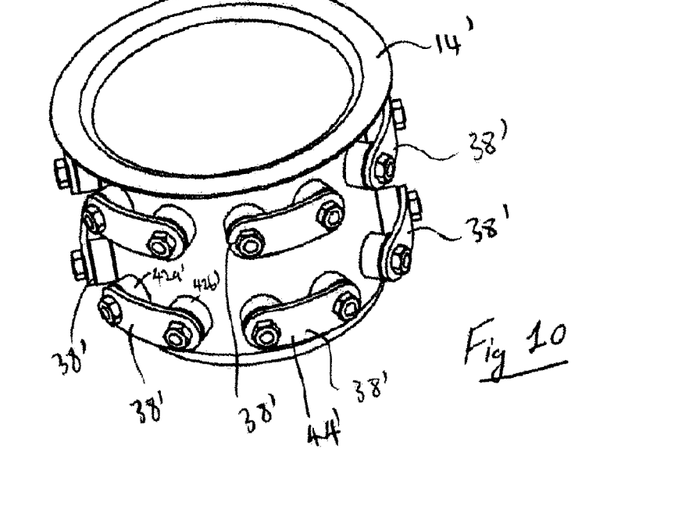
FIG. 10 shows a perspective view of an alternative arrangement of magnets on a canister, which may form part of other embodiments of the invention.

FIG. 10 shows an alternative embodiment in which twelve magnet arrays 38' are provided (four of the arrays are hidden in the Figure). In this embodiment, each magnet array 38' includes two magnets 42a', 42b'. Each magnet in the array is positioned with opposing polarity, as in the FIG. 3 embodiment. A bridge element 44' is likewise provided, although in the FIG. 10 embodiment the bridge element 44' must be curved slightly, since the magnet arrays 38' are disposed in a circumferential direction around the canister 14'.

Although FIG. 10 shows the magnet arrays 38' and the canister 14', it will be appreciated that this is merely done to show the relative positions of the arrays 38' with respect to the canister 14' in use. The magnet arrays 38' are in fact provided in carriers which in turn are mounted to a magnetic element which can be placed over the canister in use. This arrangement is described in detail with reference to FIGS. 3 and 4, but it will be apparent that the FIG. 10 embodiment is of substantially similar construction in that respect.

Referring back to FIG. 4, each magnet 42a, 42b, 42c, 42d is substantially in the shape of a short cylinder, that is, a cylinder with a height which is smaller than its diameter. In particular, the height of each cylindrical magnet may be around half of the diameter. The bridge elements 44a, 44b are substantially rectangular, with curved ends to match the boundaries of the magnets 42a, 42b, 42c, 42d.

The magnets 42a-d and bridge elements 44a, 44b are retained in the carrier 40 by screws 46.

Resilient spring members 48 are provided on the side of the carrier 40 which is disposed against the inside wall of the magnetic element 16 in use. This is the uppermost side of the carrier 40 as shown in FIG. 4. In this embodiment, the entire carrier element 40 is moulded from plastics, and the spring members 48 are formed integrally with the rest of the carrier. When assembled, the spring elements push the carrier elements 40 inwardly, away from the interior walls of the magnetic element 16 and towards and against the outer wall of the canister 14, when the magnetic element 16 is installed over the canister 14. This ensures that there is no space between the magnets 42a-d and the canister 14, providing a magnetic field inside the canister which is as strong as possible.

Figure 5:
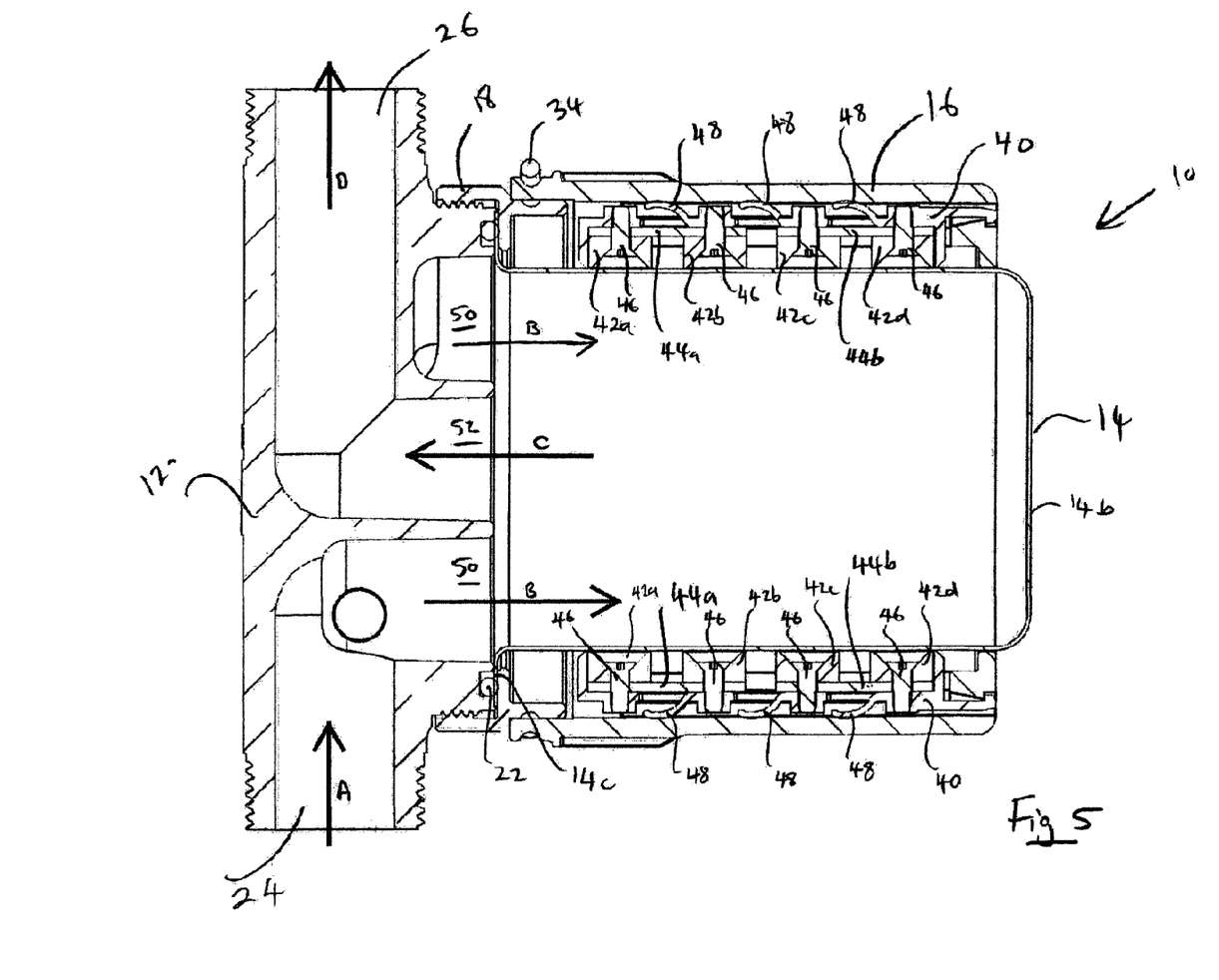
FIG. 5 is a cross-section through the filter of FIG. 1.

FIG. 5 shows how the springs 48 push the magnets 42a-d against the canister 14 in use.

Figure 6:
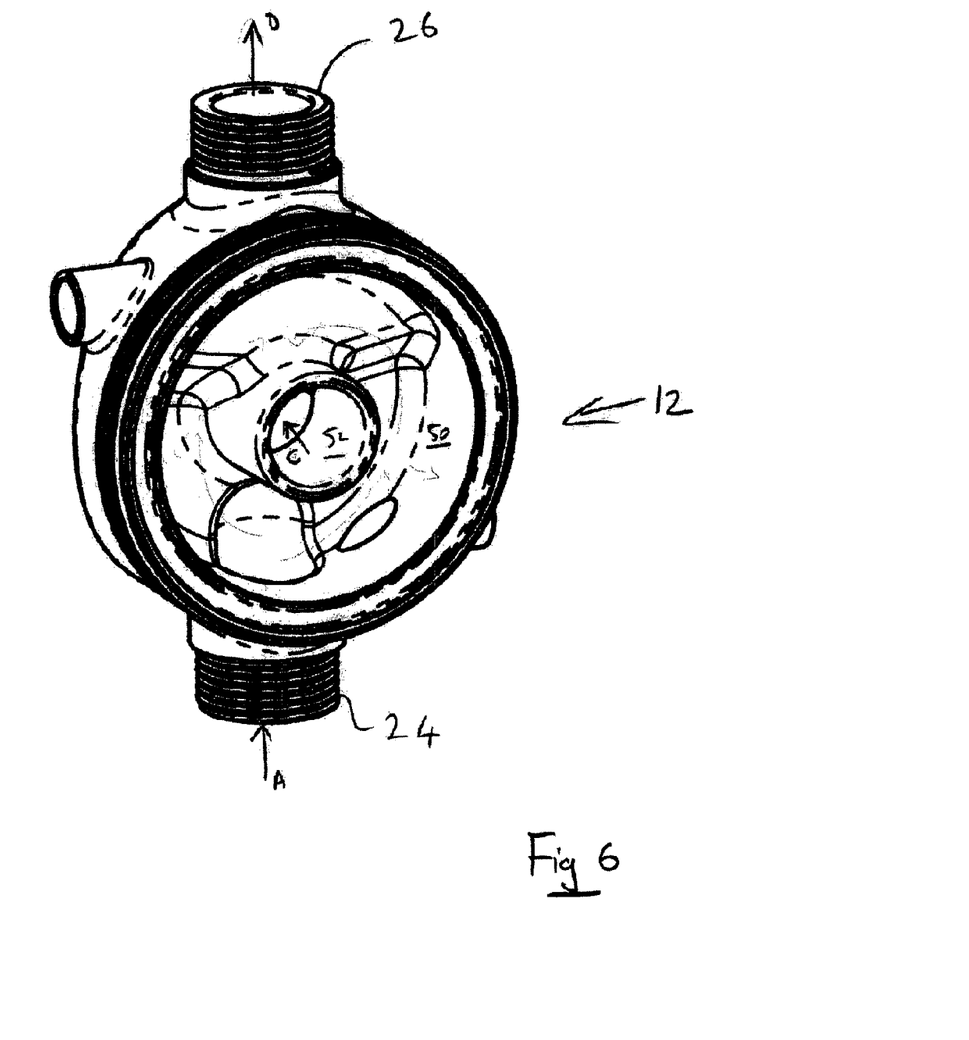
FIG. 6 shows a connection assembly, part of the filter of FIG. 1.

Also in FIG. 5, the flow path between the inlet 24, the interior of the canister 14, and the outlet 26 is shown by arrows A, B, C, D. System water enters the filter 10 at inlet port 24, which is on the bottom left in FIG. 5. Fluid flows through the connection assembly 12, which includes a circumferential flow chamber 50 around the periphery of the face of the connection assembly 12 which adjoins the canister in use. Hence, system water enters the interior of the canister 14 adjacent the walls of the canister. The water flows through the canister, where any magnetic particles entrained in the flow can be attracted and retained to the sides of the canister by magnets 42a-d in each of the four magnet arrays (two are visible in FIG. 5). The water then flows out of the filter via a central aperture 52 in the face of the connection assembly 12, which is in fluid communication with the outlet port 26. FIG. 6 is a perspective view of the connection assembly 12, looking towards the face which is normally adjacent the canister 14 in use. The circumferential flow chamber 50 and central port 52 are seen most clearly in this Figure.

Figure 7A:
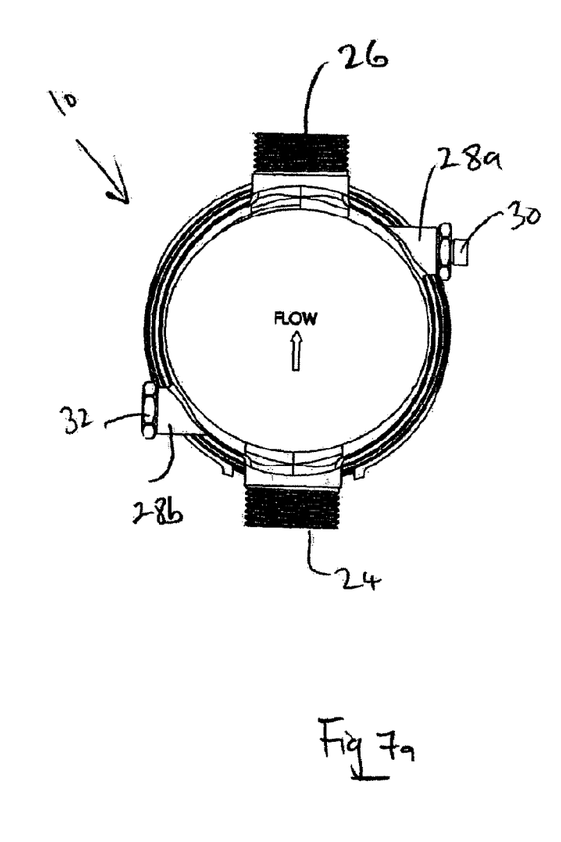
FIGS. 7a and 7b are end views of the filter of FIG. 1, showing the filter in different orientations.
Figure 7B:
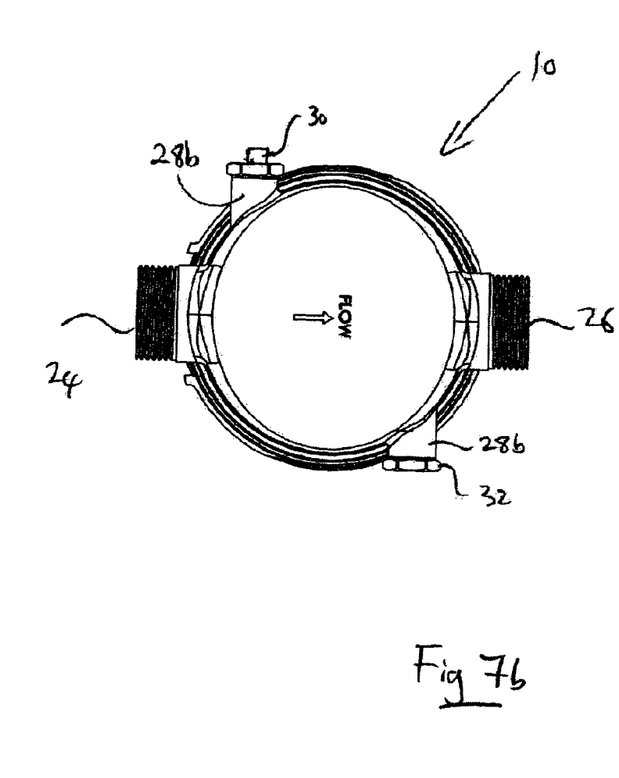

FIGS. 7a and 7b demonstrate how the filter can be installed on horizontal or vertical pipework, with the flow in substantially any direction. For example in FIG. 7a, the filter is oriented for installation on vertical pipework, where the flow is from bottom to top. Inlet port 24 is therefore at the bottom, and outlet port 26 is at the top. Note that, due to the position of the fitments 28a, 28b offset around 45 degrees clockwise from the inlet and outlet ports, one of the fitments 28a is above the other fitment 28b. Fitment 28a is therefore provided with a bleed valve fitting 30, whilst fitment 28b is provided with a drain plug.

In FIG. 7b, the filter is shown in the correct orientation for installation on horizontal pipework where the flow direction is from left to right. Hence, the inlet port is on the left and the outlet port is on the right. In this position, fitment 28b is located above fitment 28a, so the bleed fitting 30 and drain fitting 32 can simply be switched around as compared to the arrangement in FIG. 7a, so that the bleed valve remains on the top.

It will be apparent that the filter 10 is also suitable for installation on vertical pipework where the flow is top to bottom, and on horizontal pipework where the flow is right to left, by providing the bleed and drain fittings 30, 32 in the appropriate fitments 28a, 28b.

Figure 8:
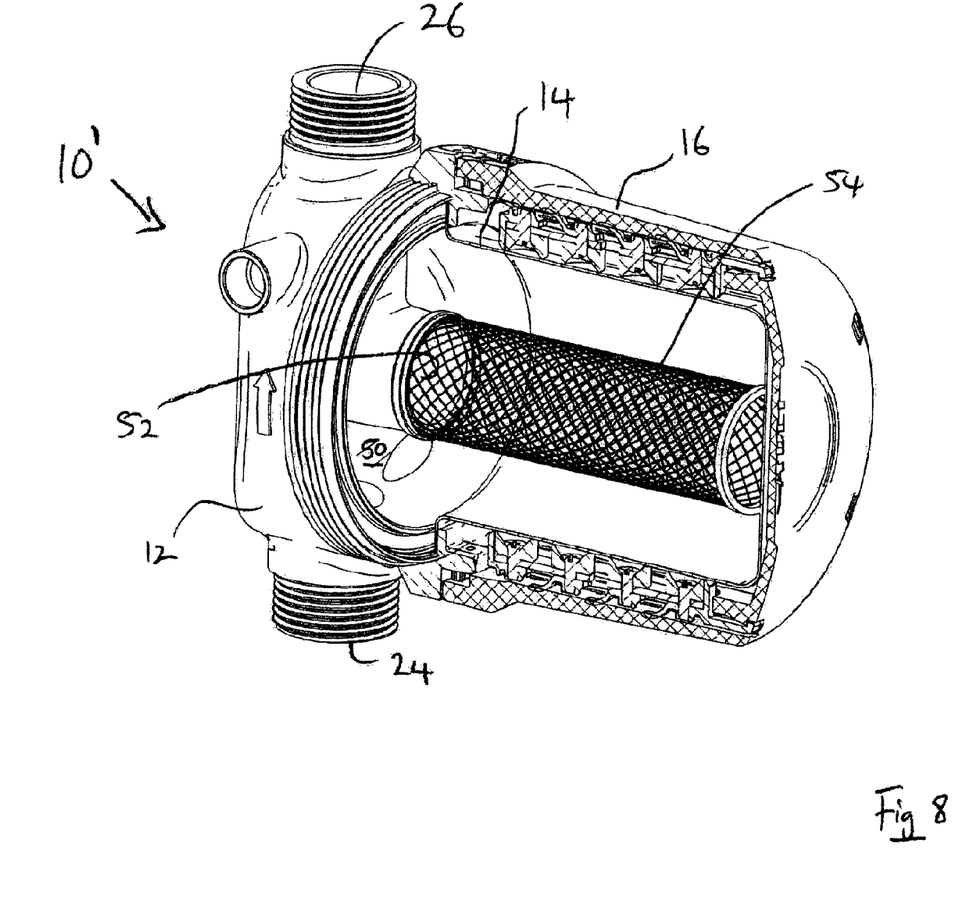
FIG. 8 shows a cut-away view of a second embodiment of a filter according to the invention.

FIG. 8 shows a second embodiment of a filter 10' according to the invention. Like the first embodiment, the filter includes a connection assembly 12, canister 14 and magnet assembly 16. However, in this embodiment, the sleeve is closed at one end (to the right hand side of the Figure) so that when the magnetic sleeve 16 is installed over the canister 14, the canister is completely hidden from view. In addition, the second embodiment includes a substantially cylindrical gauze barrier 54, which forms a filter between the central (output) aperture 52 of the connection assembly 12 and the circumferential (input) aperture 50. The gauze barrier 54 traps non-magnetic particles above a certain size, for example particles of limescale. Note that the filter can be cleared of both non-magnetic and magnetic particles without disassembly, by using the drain as described above.

The gauze barrier 54 illustrated in FIG. 8 is just one example of a means for separating non-magnetic particles in the filter, which may be provided in many embodiments of the invention.

Figure 9:
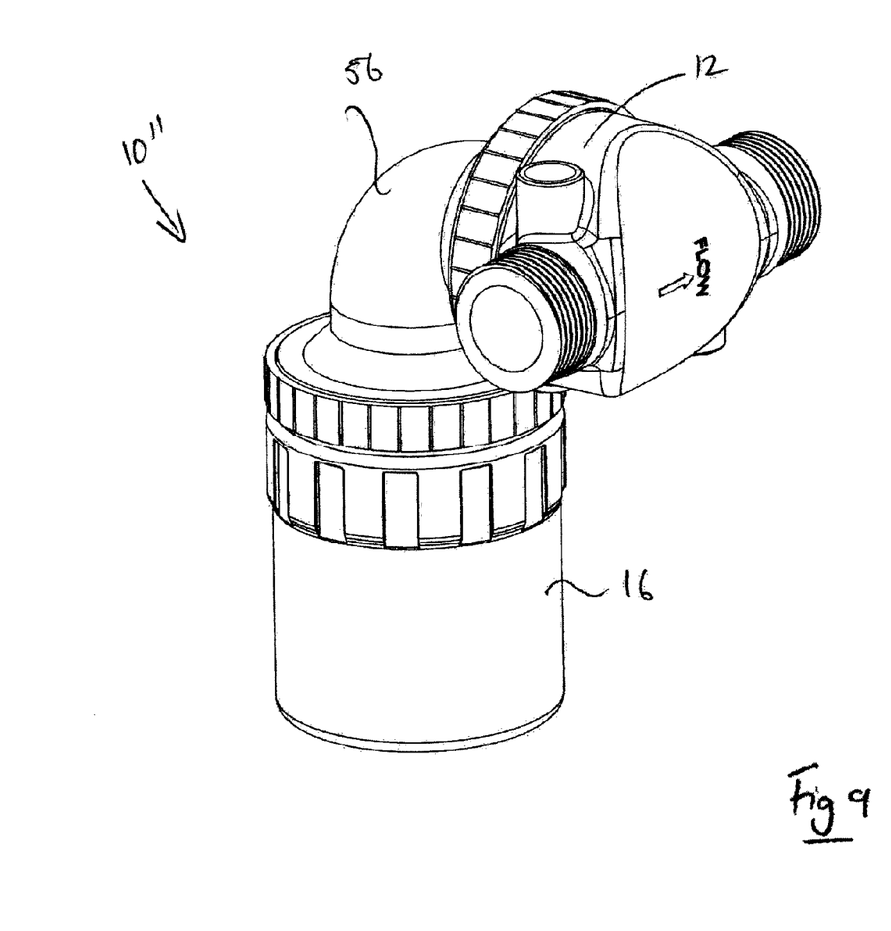
FIG. 9 shows a perspective view of a third embodiment of a filter according to the invention.

FIG. 9 shows a third embodiment of a filter 10" according to the invention. In this embodiment, an elbow connector 56 is provided between the connection assembly 12 and the canister (14) (in the drawing, the canister 14 is shown covered by the magnet assembly 16). The filter can therefore be mounted to vertical or horizontal pipework, with the canister (14) in a substantially vertical orientation in either case. In FIG. 9, the connection assembly 12 is oriented for connection to substantially horizontal pipework, but it may be rotated with respect to the elbow connector 56, leaving the canister 14 in substantially the same position, for connection with vertical pipework. Fitments (28a, 28b) may be switched in exactly the same way as is described above with reference to FIGS. 7a and 7b, to allow use of the filter in a wide range of systems. The elbow connector 56 is used to change the position of the canister 14, so that it is oriented vertically, where the space available is more suited to that configuration.

By having a connection assembly 12 which houses all external connections, and a simple thin-walled stainless steel canister which has no fittings but is just open at one end for interfacing with the connection assembly, a filter is provided which has the advantages of easy cleaning associated with other filters having externally-mounted magnets, but with separation performance which is comparable with filters having internal magnets, which need to be disassembled for cleaning. When the filter 10 needs to be cleaned, the canister 14 can remain attached to the connection assembly. The filter 10 is isolated from the central heating system circuit by closing valves, and the magnet assembly 16 is removed. The drain valve is then opened, and the fluid in the filter will flow out, where it may be captured in a bucket and disposed of. If required, one of the isolation valves may be briefly opened, to allow a quantity of pressurised water from the central heating system to escape via the drain valve 32, flushing out captured debris.

The embodiments described above are provided by way of example only, and various changes and modifications will be apparent to persons skilled in the art without departing from the scope of the present invention as defined by the appended claims.

The invention claimed is:

1. A magnetic filter for a central heating system, the filter including a connection assembly, a canister, and a magnetic element,
   the connection assembly including an inlet and an outlet for connection to a central heating circuit;
   the canister having an interior separation chamber which is fluidly connected with the inlet and outlet for allowing fluid to flow into the inlet, through the separation chamber, and out of the outlet; and
   the magnetic element being removably positionable on the outside of the canister,
the canister and the connection assembly forming a sealed flow path comprising the inlet, the interior separation chamber and the outlet, and the connection assembly further including a closable drain outlet for draining fluid and magnetic particles from within the canister, the drain outlet positioned with respect to the interior separation chamber to substantially empty the canister of magnetic particles.

2. A magnetic filter as claimed in claim 1, in which the canister is in the form of a shell having an open end.

3. A magnetic filter as claimed in claim 1, in which the canister has unbroken walls and a single opening.

4. A magnetic filter as claimed in claim 3, in which a rim surrounds the opening of the canister.

5. A magnetic filter as claimed in claim 4, in which a retaining ring is provided for holding the canister against the connection assembly.

6. A magnetic filter as claimed in claim 1, in which the magnetic element is in the form of a sleeve, which substantially surrounds the canister when attached.

7. A magnetic filter as claimed in claim 1, in which a releasable connection means is provided between the magnetic element and the rest of the filter.

8. A magnetic filter as claimed in claim 7, in which the releasable connection means is provided between the magnetic element and one of: the connection assembly, or the canister.

9. A magnetic filter as claimed in claim 1, in which the magnetic element includes at least one magnet array made up of magnets.

10. A magnetic filter as claimed in claim 9, in which each magnet in the or each magnet array is positioned with its magnetic axis substantially perpendicular to the wall of the canister, when the magnetic element is positioned over the canister in use.

11. A magnetic filter as claimed in claim 9, in which the magnets in each magnet array are arranged with alternating polarity.

12. A magnetic filter as claimed in claim 9, in which each magnet array includes at least one magnet pair, each magnet pair including a first magnet positioned with its north pole facing the canister, a second magnet with its south pole facing the canister, and a soft ferromagnetic strip disposed across the north and south poles on the side of the magnets in the pair which faces away from the canister.

13. A magnetic filter as claimed in claim 9, in which spring members are provided for pushing the magnets away from the interior walls of the magnetic element, towards the canister when the element is installed over the canister.

14. A magnetic filter as claimed in claim 1, in which the magnetic element includes magnets mounted in at least one carrier.

15. A magnetic filter as claimed in claim 14, in which spring members are provided for pushing the magnets away from the interior walls of the magnetic element, towards the canister when the element is installed over the canister, and the spring members are provided between the carrier and one of: each magnet, or the interior wall of the magnetic element.

16. A magnetic filter as claimed in claim 1, in which the inlet of the connection assembly is in fluid communication with a circumferential flow chamber.

17. A magnetic filter as claimed in claim 1, in which the outlet of the connection assembly is in fluid communication with a port on the connection assembly which interfaces with the canister in a substantially central region of the canister.

18. A magnetic filter as claimed in claim 1, in which an air bleed vent is included as part of the connection assembly.

19. A magnetic filter as claimed in claim 1, in which the inlet and outlet are provided as ports extending from either side of the connection assembly, substantially in line with each other.

20. A magnetic filter as claimed in claim 1, in which fitments are provided on the connection assembly which are interchangeably configurable as air bleed vents or as drain outlets.

21. The magnetic filter of claim 1, wherein the drain outlet is positioned close to the bottom of the filter.

22. The magnetic filter of claim 1, wherein the drain outlet is positioned below the interior separation chamber.

* * * * *